US 6,617,419 B1

(12) United States Patent
Hofmann et al.

(10) Patent No.: US 6,617,419 B1
(45) Date of Patent: Sep. 9, 2003

(54) LONG-CHAIN POLYETHER POLYOLS WITH A HIGH PROPORTION OF PRIMARY OH GROUPS

(75) Inventors: Jörg Hofmann, Krefeld (DE); Pramod Gupta, Bedburg (DE); Manfred Dietrich, Frankfurt (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/009,889

(22) PCT Filed: Apr. 11, 2000

(86) PCT No.: PCT/EP00/03217

§ 371 (c)(1),
(2), (4) Date: Jan. 28, 2002

(87) PCT Pub. No.: WO00/64963

PCT Pub. Date: Nov. 2, 2000

(30) Foreign Application Priority Data

Apr. 24, 1999 (DE) .......................................... 199 18 727

(51) Int. Cl.$^7$ ................................................ C08G 65/34
(52) U.S. Cl. .................. 528/425; 528/485; 528/502 C; 528/503
(58) Field of Search ............................... 528/425, 485, 528/502 C, 503

(56) References Cited

U.S. PATENT DOCUMENTS

| 3,404,109 A | 10/1968 | Milgrom | 260/611 |
|---|---|---|---|
| 3,829,505 A | 8/1974 | Herold | 260/611 B |
| 3,941,849 A | 3/1976 | Herold | 260/307 A |
| 4,355,188 A | 10/1982 | Herold et al. | 568/620 |
| 4,942,214 A | 7/1990 | Sakhpara | 528/59 |
| 5,158,922 A | 10/1992 | Hinney et al. | 502/175 |
| 5,482,908 A | 1/1996 | Le-Khac | 502/156 |
| 5,545,601 A | 8/1996 | Le-Khac | 502/156 |
| 5,563,221 A | 10/1996 | Pazos | 525/409 |
| 5,627,120 A | 5/1997 | Le-Khac | 502/156 |
| 5,648,559 A | 7/1997 | Hager | 568/620 |
| 5,668,191 A | 9/1997 | Kinkelaar et al. | 521/174 |
| 5,700,847 A | 12/1997 | Thompson | 521/159 |
| 6,008,263 A | 12/1999 | Thompson et al. | 521/174 |
| 6,066,683 A | 5/2000 | Beisner et al. | 521/174 |
| 6,291,388 B1 | 9/2001 | Hofmann et al. | 198/197 |
| 6,323,375 B1 | 11/2001 | Hofmann et al. | 197/197 |

FOREIGN PATENT DOCUMENTS

| EP | 0 379 184 | 7/1990 |
|---|---|---|
| EP | 0 558 840 | 9/1993 |
| WO | 98/16310 | 4/1998 |

*Primary Examiner*—Duc Truong
(74) *Attorney, Agent, or Firm*—Joseph C. Gil; John E. Mrozinski, Jr.

(57) ABSTRACT

The invention relates to long-chain polyether polyols having a content of primary OH groups of 40 to 95 mol-% and a total content of oxyethylene units of >25 wt. % as well as a process for their production by DMC-catalysed polyaddition of an ethylene oxide (EO)/propylene oxide (PO) mixture in the weight ratio of 40:60 to 95:5 as an end block to starter compounds having active hydrogen atoms.

20 Claims, No Drawings

LONG-CHAIN POLYETHER POLYOLS WITH A HIGH PROPORTION OF PRIMARY OH GROUPS

This invention relates to long-chain polyether polyols having a high content of primary Oh groups as well as a process for their production by means of double-metal cyanide (DMC) catalysis.

Long-chain polyether polyols having high contents of primary OH groups are required for many polyurethane applications. They are used, for example, in hot and cold mould foaming and in RIM applications (see, for example, Gum, Riese, Ulrich (Eds.): "Reaction Polymers", Hanser Verlag, Munich, 1992, p.67–70). Long-chain polyether polyols having high contents of primary OH groups are conventionally produced in a two-step process, wherein first of all propylene oxide (or a mixture of propylene oxide and ethylene oxide) is polymerised in the presence of starter compounds having active hydrogen atoms and of a basic catalyst, with a polyether polyol having mainly secondary OH groups being obtained. In the second step, the so-called EO tip, ethylene oxide is then added to the basic polymer, the majority of the secondary OH groups being converted into primary OH groups. In this process the same basic catalyst (for example, KOH) is conventionally used for the propoxylation reaction and for the ethoxylation reaction.

Double-metal cyanide (DMC) catalysts for the production of polyether polyols have been known for a long time (see, for example, U.S. Pat. No. 3,404,109, U.S. Pat. No. 3,829,505, U.S. Pat. No. 3,941,849 and U.S. Pat. No. 5,158,922). Compared with the conventional production of polyether polyols by means of basic catalysts, the use of these DMC catalysts for the production of polyether polyols brings about in particular a decrease in the content of monofunctional polyethers with terminal double bonds, so-called monools. The polyether polyols thus obtained can be processed to form high-quality polyurethanes (for example, elastomers, foams, coatings). Improved DMC catalysts, of the type described, for example, in EP-A 700,949, EP-A 761,708, WO 97/40086, WO98/16310, DE-A 197 45 120, DE-A 197 57 574 and DE-A 198,102,269, possess in addition an exceptionally high activity and render possible the production of polyether polyols at very low concentrations of catalyst (25 ppm or less), so that a separation of the catalyst from the polyol is no longer necessary.

A disadvantage in the use of DMC catalysts for the production of polyether polyols is that with these catalysts, unlike basic catalysts, a direct EO tip is not possible. If ethylene oxide (EO) is added to a poly(oxypropylene) polyol containing a DMC catalyst, the result is a heterogeneous mixture which consists for the most part of unreacted poly(oxypropylene) polyol (having mainly secondary OH groups) and to a small extent of highly ethoxylated poly(oxypropylene) polyol and/or polyethylene oxide. The conventional way of obtaining DMC polyols having a high content of primary OH groups consists, therefore, in carrying out the EO tip in a second, separate step by means of conventional base catalysis (for example, KOH catalysis) (see, for example, U.S. Pat. No. 4,355,188, U.S. Pat. No. 4,721,818, EP-A 750,001). A particular disadvantage of this two-step process is that the basic polymer obtained in the process has to be worked up in a very expensive way, for example, by neutralisation, filtration and dehydration.

U.S. Pat. No. 5,648,559 discloses poly(oxyalkylene) polyols having poly(oxypropylene/-oxyethylene) end blocks, the polyols being produced by DMC catalysis and having a content of primary hydroxyl groups of <50 mol-%. The maximum total content of oxyethylene units in these polyols is 20 wt. %. U.S. Pat. No. 5,700,847 describes poly(oxyalkylene) polyols having up to 25 wt. % oxyethylene units, the latter being containable in mixed blocks or pure poly(oxyethylene) end blocks. The polyols produced without EO tip have <50 mol % of primary OH groups. In U.S. Pat. No. 5,668,191, likewise poly(oxyalkylene) polyols having a maximum of 20 wt. % oxyethylene units and less than 50 mol % of primary hydroxyl groups are used.

It has now been found that long-chain polyether polyols having a content of primary OH groups of >50 mol-% can be obtained by DMC-catalysed polyaddition of an ethylene oxide (EO)/propylene oxide (PO) mixture as an end block to starter compounds having active hydrogen atoms, if the total content of oxyethylene units in the polyol is established at more than 25 wt. %.

The present invention provides long-chain polyether polyols having a content of primary OH groups of 40 to 95 mol-%, preferably 50 to 90 mol %, and a total content of oxyethylene units of more than 25 wt. %, preferably more than 30 wt. %, particularly preferably more than 35 wt. %, which have a poly(oxyethylene/-oxypropylene) end block produced in the presence of a DMC catalyst.

The invention also provides a process for producing the polyols according to the invention by polyaddition of an ethylene oxide (EO)/propylene oxide (PO) mixture in the weight ratio EO:PO of 40:60 to 95:5, preferably 50:50 to 90:10, particularly preferably 60:40 to 90:10, in the presence of DMC catalysts, as an end block to starter compounds having active hydrogen atoms.

The DMC catalysts which are suitable for the process according to the invention are known in principle and are described in detail in the prior art cited above. It is preferable to use improved, highly active DMC catalysts, which are described, for example, in EP-A 700,949, EP-A 761,708, WO 97/40086, WO98/16310, DE-A 197 45 120, DE-A 197 57 574 and DE-A 198,102,269. Typical examples are the DMC catalysts described in EP-A 700,949 which, besides a double-metal cyanide compound (for example, zinc hexacyanocobaltate(III)) and an organic complexing ligand (for example, tert. butanol), also contain a polyether having a number average molecular weight of more than 500 g/mol.

The compounds used as starter compounds having active hydrogen atoms are preferably those with molecular weights of 18 to 2,000 g/mol, preferably 200 to 2,000 g/mol and 1 to 8, preferably 2 to 6, hydroxyl groups. Examples which may be given are butanol, ethylene glycol, diethylene glycol, triethylene glycol, 1,2-propylene glycol, 1,4-butanediol, 1,6-hexanediol, bisphenol A, trimethylolpropane, glycerol, pentaerythritol, sorbitol, cane sugar, degraded starch or water.

It is more advantageous to use those starter compounds having active hydrogen atoms which have been prepared from the above-mentioned low-molecular starters, for example, by conventional alkaline catalysis and are oligomeric alkoxylation products with number average molecular weights of 200 to 2,000 g/mol.

Compounds preferably used are oligonmeric propoxylated starter compounds having 1 to 8 hydroxyl groups, particularly preferably 2 to 6 hydroxyl groups, and number average molecular weights of 200 to 2,000 g/mol.

By DMC-catalysed polyaddition to an ethylene oxide/propylene oxide mixture in the weight ratio EO:PO of 40:60 to 95:5, preferably 50:50 to 90:10, particularly preferably 60:40 to 90:10, as end block, the starter compounds having active hydrogen atoms can be directly converted into a long-chain polyether polyol having a high content of primary OH groups and a content of oxyethylene units of >25 wt. %, preferably >30 wt. %, particularly preferably >35 wt. %.

It is preferred, however, first of all to extend the starter compound by DMC-catalysed propoxylation, preferably to a number average molecular weight of between 500 and 15,000 g/mol, and subsequently, from this extended propoxylated intermediate, by DMC-catalysed polyaddition to an ethylene- oxide/propylene oxide mixture in the weight ratio EO:PO of 40:60 to 95:5, preferably 50:50 to 90:10, particularly preferably 60:40 to 90:10, as end block, to produce a long-chain polyether polyol having a high content of primary OH groups and a content of oxyethylene units of >25 wt. %, preferably >30 wt. %, particularly preferably >35 wt. %.

In this case the process according to the invention is particularly preferably carried out as a so-called "one-pot reaction" wherein, after the DMC-catalysed propoxylation, without intermediate working up of the polymer containing the DMC catalyst, the polyaddition of the ethylene oxide/propylene oxide mixture as end block is subsequently carried out in the same reaction vessel and with the same DMC catalyst.

The DMC-catalysed polyaddition of the ethylene oxide/propylene oxide mixture as end block to the starter compounds (or to the extended propoxylated intermediates) is generally carried out at temperatures of 20° C. to 200° C., preferably within the range of 40° C. to 180° C., particularly preferably at temperatures of 50° C. to 150° C. The reaction can be carried out at total pressures of 0.001 to 20 bar. The polyaddition can be carried out in bulk or in an inert, organic solvent, such as toluene or THF. The quantity of solvent is conventionally 10 to 30 wt. %, based on the quantity of the polyether polyol to be produced.

The polyaddition can be carried out continuously or discontinuously, for example, in a batch or semi-batch process.

The weight ratio of the ethylene oxide/propylene oxide mixture to be used is 40:60 to 95:5, preferably 50:50 to 90:10, particularly preferably 60:40 to 90:10.

The molecular weights of the polyether polyols having a high content of primary OH groups and produced by the process according to the invention are within the range of between 1,000 and 100,000 g/mol, preferably within the range of 1,500 to 50,000 g/mol, particularly preferably within the range of 2,000 to 20,000 g/mol.

The content of primary OH groups can be determined in accordance with ASTM-D 4273-83, from the $^1$H-NMR spectra of the peracetylated polyether polyols. The content of primary OH groups in the polyether polyols is 40 to 95 mol%, preferably 50 to 90 mol-%. The content of primary OH groups in the polyether polyols is dependent upon the reaction conditions, such as pressure, temperature and solvent as well as on the composition of the ethylene oxide/propylene oxide mixture used. In general, an increase in the ethylene oxide content in the ethylene oxide/propylene oxide mixture leads to an increase in the content of primary OH groups in the polyether polyol.

The concentration of DMC catalyst is so chosen that an effective control of the polyaddition reaction is possible under the given reaction conditions. The concentration of catalyst is generally within the range of 0.0005 wt. % to 1 wt. %, preferably within the range of 0.001 wt. % to 0.1 wt. %, particularly preferably within the range of 0.001 wt. % to 0.01 wt. %, based on the quantity of the polyether polyol to be produced.

Highly active DMC catalysts render possible the production of long-chain polyether polyols having a high content of primary OH groups with a very low concentration of catalyst (50 ppm or less, based on the quantity of the polyether polyol to be produced). If the polyether polyols produced in this way are used for the production of polyurethanes, a removal of the catalyst from the polyether polyol can be dispensed with, without impairing the product qualities of the polyurethane obtained.

EXAMPLES

Preparation of Highly Active DMC Catalyst
(Synthesis in Accordance With EP-A 700 949)

A solution of 12.5 g (91.5 mMol) zinc chloride in 20 ml distilled water is added, with vigorous stirring (24,000 rev/min) to a solution of 4 g (12 mMol) potassium hexacyanocobaltate in 70 ml distilled water. Immediately afterwards a mixture of 50 g tert. butanol and 50 g distilled water is added to the suspension formed, which is then vigorously stirred (24,000 rev/min) for 10 minutes. Then a mixture of 1 g polypropylene glycol having a number average molar mass of 2,000 g/mol, 1 g tert. butanol and 100 g distilled water are added thereto and the whole is stirred (1000 rev/min) for 3 minutes. The solid substance is isolated by a filtration, then stirred (10,000 rev/min) for 10 minutes with a mixture of 70 g tert. butanol, 30 g distilled water and 1 g of the above polypropylene glycol and again filtered. Finally, it is stirred (10,000 rev/min) once more for 10 minutes with a mixture of 100 g tert. butanol and 0.5 g of the above polypropylene glycol. After filtration, the catalyst is dried to constant weight at 50° C. and standard pressure.

Yield of dried, pulverulent catalyst: 6.23 g

Example 1

873 g poly(oxypropylene) triol starter compound (number average molecular weight=440 g/mol) and 0.30 g DMC catalyst (50 ppm, based on the quantity of the long-chain polyether polyol to be produced) are placed under protective gas (nitrogen) in a 10 l glass pressure flask and heated to 105° C., with stirring. Then ethylene oxide/propylene oxide mixture in the weight ratio 70:30 (approx. 100 g) is added all at once, until the total pressure has risen to 1.5 bar. Further ethylene oxide/propylene oxide mixture is then only added again if an accelerated pressure loss is observed. This accelerated pressure loss indicates that the catalyst is activated. Then the rest of the ethylene oxide/propylene oxide mixture in the weight ratio 70:30 (5027 g) is added continuously at a constant total pressure of 1.5 bar. After addition of all the atkylene oxide and 5 hours post-reaction time at 105° C., volatile constituents are distilled off at 105° C. (1 mbar) and the mixture is subsequently cooled to room temperature.

The long-chain polyether polyol obtained has an OH value of 59.1 mg KOH/g, a content of double bonds of 2 mMol/kg, a content of primary OH groups of 56 mol-% and a content of oxyethylene units of 59.8 wt. %.

Example 2

873 g poly(oxypropylene) triol starter compound (number average molecular weight 440 g/mol) and 0.30 g DMC catalyst (50 ppm, based on the quantity of the long-chain polyether polyol to be produced) are placed under protective gas (nitrogen) in a 10 l glass pressure flask and heated to 105° C., with stirring. Then ethylene oxide/propylene oxide mixture in the weight ratio 89.4:10.6 (approx. 100 g) is added all at once, until the total pressure has risen to 1.5 bar. Further ethylene oxide/propylene oxide mixture is then only added again if an accelerated pressure loss is observed. This accelerated pressure loss indicates that the catalyst is activated. Then the rest of the ethylene oxide/propylene oxide mixture in the weight ratio 89.4:10.6 (5027 g) is added continuously at a constant total pressure of 1.5 bar. After addition of all the alkylene oxide and 5 hours post-reaction time at 105° C., volatile constituents are distilled off at 105° C. (1 mbar) and the mixture is subsequently cooled to room temperature.

The long-chain polyether polyol obtained has an OH value of 58.5 mg KOH/g, a content of double bonds of 2 mMol/kg, a content of primary OH groups of 81 mol-% and a content of oxyethylene units of 76.4 wt. %.

Example 3

840 g poly(oxypropylene) triol starter compound (number average molecular weight=446 g/mol) and 0.30 g DMC catalyst (50 ppm, based on the quantity of the long-chain polyether polyol to be produced) are placed under protective gas (nitrogen) in a 10 l glass pressure flask and heated to 105° C., with stirring. Then propylene oxide (approx. 100 g) is added all at once, until the total pressure has risen to 1.5 bar. Further propylene oxide is then only added again if an accelerated pressure loss is observed. This accelerated pressure loss indicates that the catalyst is activated. Then the rest of the propylene oxide (2152 g) is added continuously at a constant total pressure of 1.5 bar. Then ethylene oxide/propylene oxide mixture in the weight ratio 80:20 (2908 g) is added continuously at a constant total pressure of 1.5 bar. After addition of all the alkylene oxide and 5 hours post-reaction time at 105° C., volatile constituents are distilled off at 105° C. (1 mbar) and the mixture is subsequently cooled to room temperature.

The long-chain polyether polyol obtained has an OH value of 53.9 mg KOH/g, a content of double bonds of 5 mMol/kg, a content of primary OH groups of 52 mol-% and a content of oxyethylene units of 38.8 wt. %.

Example 4

840 g poly(oxypropylene) triol starter compound (number average molecular weight=446 g/mol) and 0.30 g DMC catalyst (50 ppm, based on the quantity of the long-chain polyether polyol to be produced) are placed under protective gas (nitrogen) in a 10 l glass pressure flask and heated to 105° C., with stirring. Then propylene oxide (approx. 100 g) is added all at once, until the total pressure has risen to 1.5 bar. Further propylene oxide is then only added again if an accelerated pressure loss is observed. This accelerated pressure loss indicates that the catalyst is activated. Then the rest of the propylene oxide (989 g) is added continuously at a constant total pressure of 1.5 bar. Then ethylene oxide/propylene oxide mixture in the weight ratio 80:20 (4071 g) is added continuously at a constant total pressure of 1.5 bar. After addition of all the alkylene oxide and 5 hours post-reaction time at 105° C., volatile constituents are distilled off at 105° C. (1 mbar) and the mixture is subsequently cooled to room temperature.

The long-chain polyether polyol obtained has an oh value of 54.0 mg KOH/g, a content of double bonds of 2 mMol/kg, a content of primary oh groups of 67 mol-% and a content of oxyethylene units of 54.3 wt. %.

What is claimed is:

1. A polyether polyol having a primary OH content of from about 40 to about 95 mol-%, based on the amount of OH groups in the polyether polyol, with an oxyethylene unit content of at least 25 wt. %, based on the total weight of the polyether polyol, wherein the polyether polyol contains an ethylene oxide/propylene oxide end block produced in the presence of a double-metal cyanide catalyst.

2. The polyether polyol according to claim 1, wherein the polyether polyol has a number average molecular weight of 1,000 to 100,000 g/mol.

3. The polyether polyol according to claim 1, wherein the double-metal cyanide catalyst comprises:
    (a) a double-metal cyanide compound;
    (b) an organic complexing ligand; and
    (c) a polyether having a number average molecular weight greater than about 500 g/mol.

4. The polyether polyol according to claim 1, wherein the ethylene oxide and propylene oxide are present in a ratio of from 40:60 to 95:5, by weight.

5. A process for producing polyether polyols having from about 40 to about 95 mol-%, based on the amount of OH groups in the polyether polyol, of primary OH groups comprising:
    reacting starter compounds having active hydrogen atoms with an ethylene oxide/propylene oxide mixture in the presence of a double-metal cyanide catalyst, wherein the ethylene oxide and propylene oxide are present in the ethylene oxide/propylene oxide mixture in a ratio of from 40:60 to 95:5, by weight.

6. The process according to claim 5, wherein the starter compounds have from 1 to 8 hydroxyl groups and a molecular weight of 18 to 2,000 g/mol.

7. The process according to claim 5, wherein the starter compounds are oligomeric propoxylated starter compounds having 1 to 8 hydroxyl groups and a number average molecular weight of 200 to 2,000 g/mol.

8. The process according to claim 5, wherein the starter compounds are first extended by propoxylation in the presence of a double-metal cyanide catalyst.

9. The process according to claim 8, wherein the starter compound is extended to a number average molecular weight between 500 and 15,000 g/mol.

10. The process according to claim 5, wherein the polyaddition is at temperatures in the range of from about 20° and 200° C.

11. The process according to claim 5, wherein the polyaddition is carried out at total pressures of from about 0.001 to 20 bar.

12. The process according to claim 5, wherein the polyaddition is optionally carried out in an inert, organic solvent.

13. The process according to claim 12, wherein, if present, the solvent is toluene or THF.

14. The process according to claim 12, wherein the solvent, if present, is present in an amount between about 10 to 30 wt. %, based on the total weight of the polyether polyol.

15. The process according to claim 5, wherein the double-metal cyanide catalyst comprises:
    (a) a double-metal cyanide compound;
    (b) an organic complexing ligand; and
    (c) a polyether having a number average molecular weight greater than about 500 g/mol.

16. The process according to claim 5, wherein the double-metal cyanide catalyst is present in an amount of from about 0.001 to 0.1 wt. %, based on the total weight of the polyether polyol.

17. A polyether polyol according to claim 1, wherein the polyether polyol is used for producing polyurethanes, polyurethane ureas or polyureas.

18. The process according to claim 5, wherein the starter compounds are selected from the group consisting of butanol, ethylene glycol, diethylene glycol, triethylene glycol, 1,2-propylene glycol, 1,4-butanediol, 1,6- hexanediol, bisphenol A, trimethylolpropane, glycerol, pentaerythritol, sorbitol, cane sugar, degraded starch or water.

19. A polyether polyol having a primary OH content of from about 40 to about 95 mol-%, based on the amount of OH groups in the polyether polyol, with an oxyethylene unit content of at least 30 wt. %, based on the total weight of the polyether polyol, wherein the polyether polyol contains an ethylene oxide/ propylene oxide end block produced in the presence of a double-metal cyanide catalyst.

20. A polyether polyol having a primary OH content of from about 40 to about 95 mol-%, based on the amount of OH groups in the polyether polyol, with an oxyethylene unit content of at least 35 wt. %, based on the total weight of the polyether polyol, wherein the polyether polyol contains an ethylene oxide/ propylene oxide end block produced in the presence of a double-metal cyanide catalyst.

* * * * *